Sept. 17, 1935.  P. F. MARTINUZZI  2,014,905

CHANGE SPEED MECHANISM

Filed June 15, 1933  3 Sheets-Sheet 1

Inventor
Pio Franco Martinuzzi
By Blackmore, Spencer & Hick
Attorneys

Sept. 17, 1935.　　P. F. MARTINUZZI　　2,014,905

CHANGE SPEED MECHANISM

Filed June 15, 1933　　3 Sheets-Sheet 2

Inventor
Gio Franco Martinuzzi
By Blackmore, Spencer & Flint
Attorneys

Patented Sept. 17, 1935

2,014,905

UNITED STATES PATENT OFFICE 2,014,905

CHANGE SPEED MECHANISM

Pio Franco Martinuzzi, Richmond, England, assignor to General Motors Corporation, New York, N. Y., a corporation of Delaware Application June 15, 1933, Serial No. 675,965
In Great Britain June 20, 1932

3 Claims. (Cl. 74—375)

This invention comprises improvements in or relating to change speed mechanisms. It is an object of the present invention to provide a simplified form of change speed gear box or boxes of the type in which there are in effect two change speed mechanisms in series with one another.

The present invention comprises in a power transmission gear the combination of a clutch, a speed change mechanism in series with the clutch and a second speed change mechanism of "easy change type" in series with and beyond the first from the clutch. The second speed change mechanism may be described as a "relay" gear which serves to double the number of speeds obtainable from the first speed change mechanism. It is a very important advantage of the arrangement described that the speed change of the relay gear can be easily effected by an unskilled operator and that by putting the relay gear into neutral the first speed change mechanism becomes isolatable from both the load and the driving force, the one by the clutch and the other by the relay gear being in neutral, and thus speed changes of the first speed change mechanism are facilitated.

The term speed change mechanism of "easy change type" is used to indicate the various types of mechanism in which variations of speed ratio are more readily effected than when sliding gears or dog clutches alone are employed, as for example mechanisms in which the friction or like clutches are used to engage the gears. One type of gear which answers to this description is of the well-known epicyclic and band-brake type. A type of easy change gear to which the invention easily lends itself, however, and the use of which forms a feature of the invention, is that in which the gears are engaged by means of combined synchronizing friction and positive dog clutches, known as synchro-mesh gears. Such gears are described, for example in British Patent No. 342,824.

Preferably the first and second speed change mechanisms have their controls interlinked with one another so that whenever the first speed change mechanism has a change of ratio brought into engagement the second mechanism must be in neutral. This arrangement does not necessarily only apply in cases where a clutch is used and therefore the invention includes in a transmission gear the combination of two speed change mechanisms in series with one another, whereof the one nearer to the source of power (or, where a clutch is used, the one nearer to the clutch) is so controlled that engagement of a fresh speed in it can only be effected when the mechanism further from the engine or clutch is in the neutral position.

In one mechanical arrangement a single control lever is provided with operative connections to each of the speed change mechanisms so arranged that movement of the control lever in one dimension brings about change of speed of one mechanism, while movement of the control lever in another dimension brings about change of speed of the other mechanism, means preferably being provided whereby movement in the dimension to change the first mechanism (nearer to the source of power or clutch) can be effected only when the speed change mechanism further from the source of power or clutch is in neutral.

When the change speed mechanisms are of the layshaft type it is possible, and it constitutes a further feature of the present invention, so to arrange matters that one of the pairs of gears of the first speed change mechanism also constitutes one of the pairs of gears of the second speed change mechanism. By this means the number of gears and the overall length of the gear box is materially reduced without in any way interfering with the advantageous properties of the mechanism as a whole. In this construction it will be found that it is desirable that the pair of gears which serves as an element of both the speed change mechanisms should have a ratio equal to or near to unity, in order that the various combinations of gears may give a suitably graded series of ratios.

The gear changing mechanism may be directly actuated by the control lever or the mechanism may be adapted to be actuated by fluid pressure, for example compressed air or engine suction by means of a servo control, and the control may be preselective or automatic, as hereinafter described.

The accompanying drawings illustrate by way of example various possible arrangements of gear box in accordance with the present invention.

In the drawings:

Figure 5 is a section upon the line 5—5 of

Figure 3:
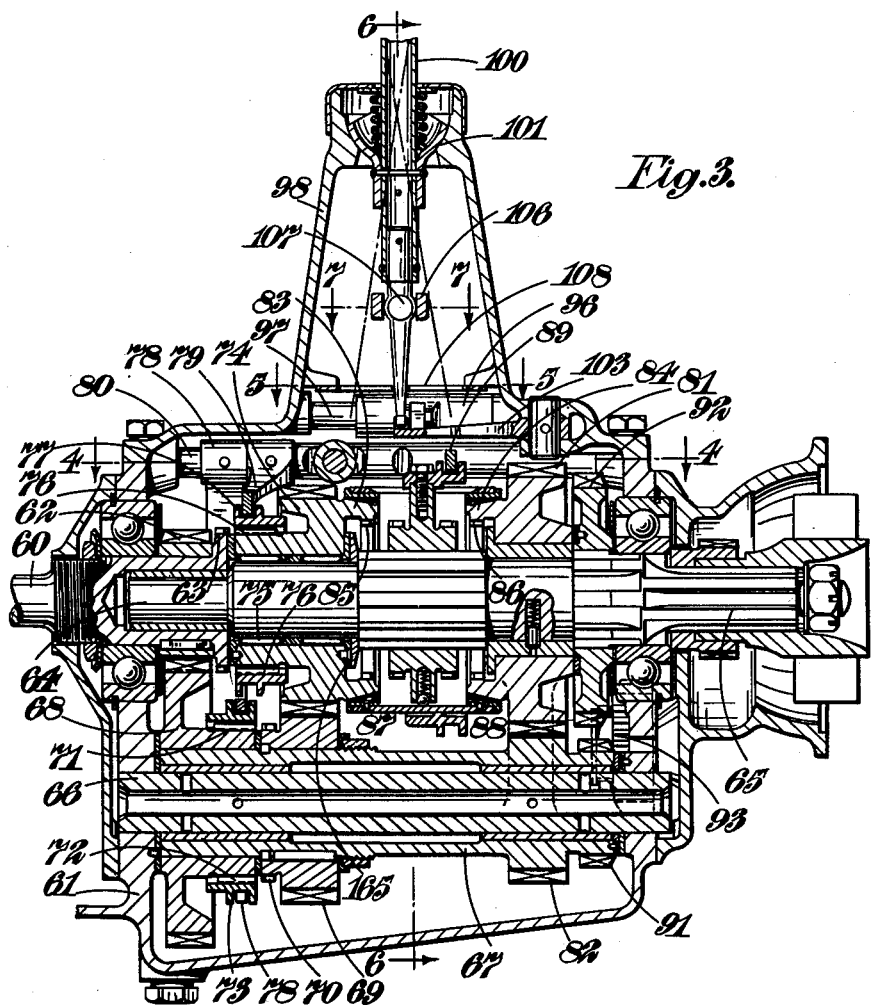
Figure 3 is a vertical and more detailed section through a third form.

Figure 3 looking in the direction of the arrows.

Figure 6:
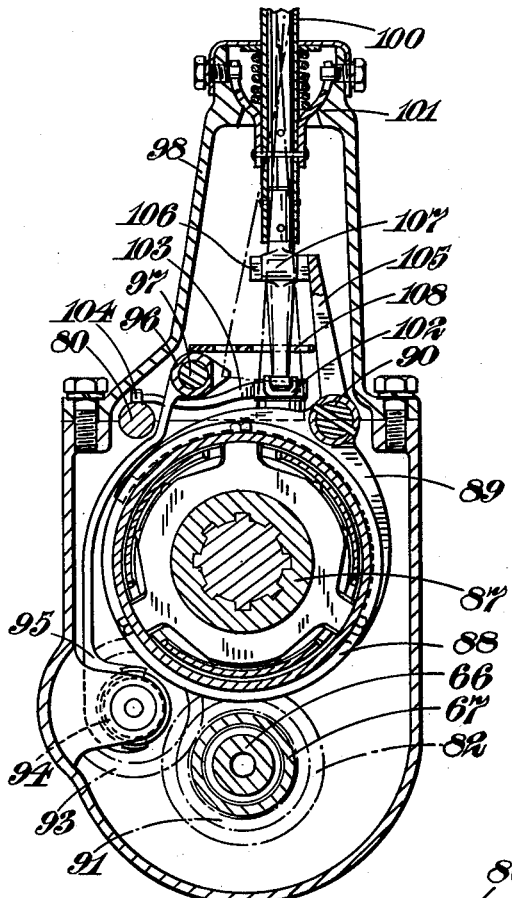

Figure 6 is a section upon the line 6—6 of Figure 3 looking in the direction of the arrows.

Figure 7:
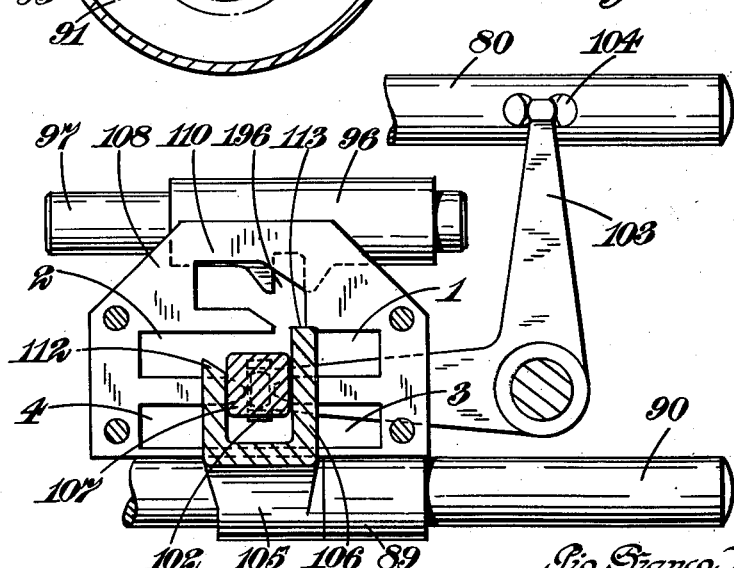

Figure 7 is a detail indicating the arrangements for moving from forward into reverse gear and is taken upon the line 7—7 of Figure 3, but drawn to a larger scale than that figure.

Figure 8:
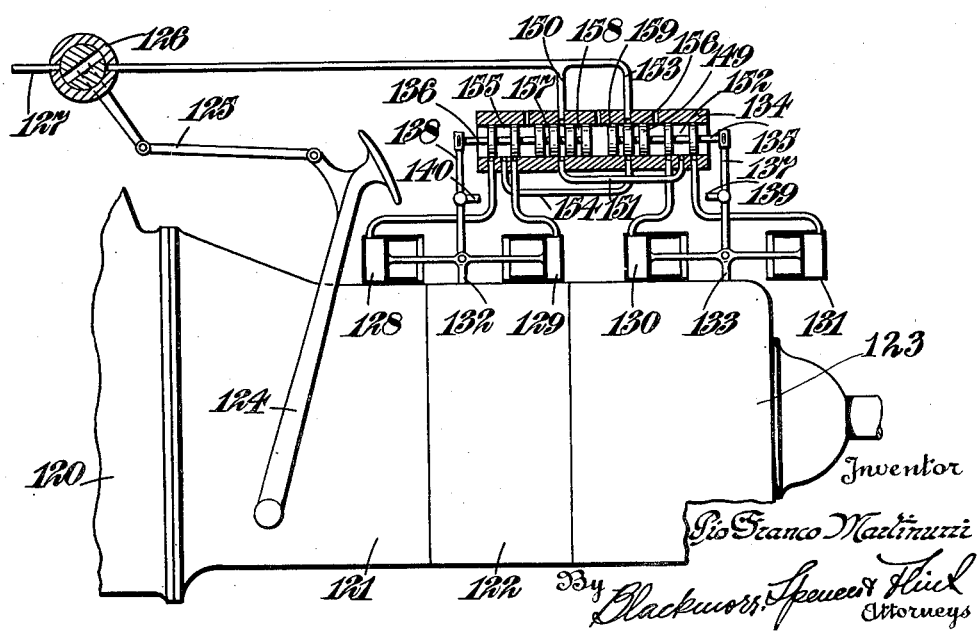

Figure 8 is a diagram of a servo-operated gear box.

Figure 9:
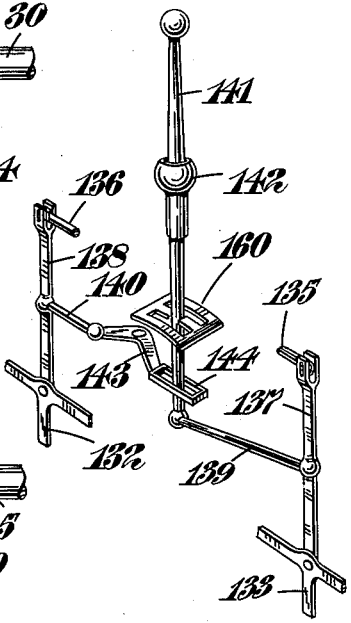

Figure 9 is a diagram of the operating control lever of the mechanism illustrated in Figure 8.

Figure 1:
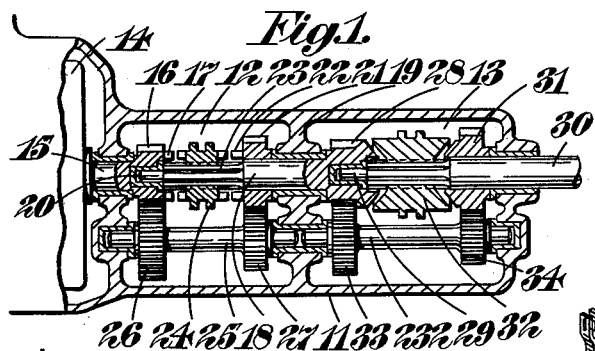
Figure 1 is a diagrammatic vertical section through one form of gear box.

Referring to Figure 1, 11 represents a casing which contains a first gear chamber 12 and a second gear chamber 13. A driving shaft from the clutch 14 enters the first gear chamber at 15 and carries a pinion 16 and dog teeth 17. An intermediate shaft 18 journalled in a partition 19 between the gear chambers 12 and 13 is located axially in line with the shaft 15 and journalled at 20 in a bush in the end of the shaft 15. The intermediate shaft carries a driven pinion 21 having dog teeth 22 and it is splined at 23 to fit a sliding dog clutch member 24 having teeth to engage the dogs 17 and 22. Thus the intermediate shaft 18 may either be directly clutched to the shaft 15 or alternatively clutched to the pinion 21, which otherwise runs freely upon it.

A layshaft 25 is journalled in bearings below the shafts 15 and 18 and carries fast upon it pinions 26, 27 which mesh respectively with the pinions 16 and 21. The above described mechanism constitutes the first speed change mechanism of the gear and it will be seen that it is a speed gear of the layshaft type giving either a direct drive when the dog clutch 24 is moved forwardly or an indirect drive at a lower speed when the dog clutch 24 is moved rearwardly.

The intermediate shaft 18 enters the second gear chamber 13 and carries a pinion 28. It also houses the forward end 29 of a driven shaft 30 and the driven shaft 30 carries at the back end of the box a pinion 31 mounted freely upon it. Between the pinions 28 and 31 there is a gear change member 32 splined on the shaft 30 and carrying friction clutch faces to engage alternatively with either the pinion 28 or the pinion 31. A second layshaft 232 lies below the shaft 30 and carries pinions 33, 34 which mesh respectively with the pinions 28 and 31. The sliding clutch member 32 is intended diagrammatically to illustrate an "easy change" clutch member of the synchro mesh type, that is to say of the type which embodies synchronizing friction surfaces in combination with dog clutch members. The dog clutch members and the details, however, are not illustrated herein inasmuch as they are well known in themselves and are described in the aforementioned British Patent Specification No. 342,824.

It will be seen that the gears contained in the second gear chamber 13 constitute a second two-speed mechanism of the layshaft type having an "easy change" action and this second two-speed mechanism may be described as a relay gear box, that is to say it serves to modify the effect of the speed changes brought about in the first gear box. Thus it doubles the number of gears provided by the first gear box and it permits of an easy change from the higher to the lower range of gears thus provided, whether the first gear box be running on its higher gear or its lower gear. Moreover, if the relay gear is placed in neutral before the first gear is shifted, even when no "easy change" mechanism is provided in the first gear box the changing of gear in the first gear box is greatly facilitated because the gear is not only disconnectible from the drive by the clutch 14 but is also disconnected from the driven load by the relay gear being placed in neutral, and under these conditions a simple dog-change can be easily and noiselessly effected without great skill.

It will be obvious that by interconnecting the controls of the two sliding change members 24 and 32 in a proper manner the described order of changing of the gears can be automatically ensured and a suitable construction for carrying this into effect in a practical way is hereinafter described in connection with the form of gear illustrated in Figures 3–7.

Figure 2:
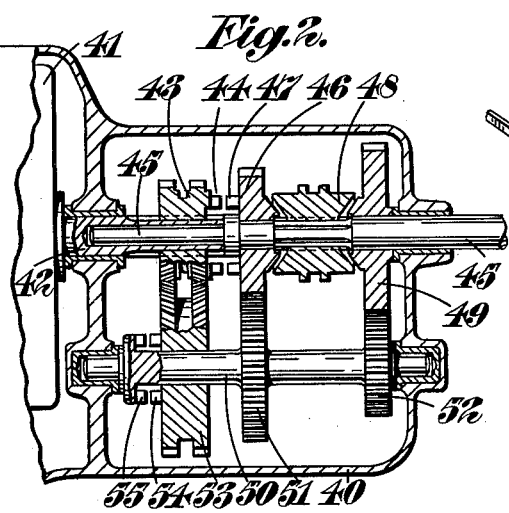
Figure 2 is a similar view of a second form.

Figure 2 illustrates a modification of the gear shown in Figure 1 in which in effect the rear pair of gears 21, 27 of the first gear box and the front pair of gears 28, 33 of the second gear box are brought together as a single pair thus simplifying the construction.

In this figure a casing 40 is shown which is united to the casing around the clutch 41 from which a driving shaft 42 enters the casing. The driving shaft 42 is splined and carries a gear wheel 43 which slides upon it and is provided with dog teeth 44. The driven shaft 45 in line with the driving shaft 42 enters the casing 40 from the rear end and is journalled at its forward end in the shaft 42. The driven shaft 45 carries close to the end of the driving shaft 42 a pinion 46 having dog teeth 47 which can be engaged with the dog teeth 44 on the pinion 43 if the latter is slid rearwardly into engagement therewith. The pinion 46 also has friction and dog teeth engagement with an "easy change" clutch member 48 splined to the shaft 45. A second driven pinion 49 is mounted on the shaft 45 on the other side of the "easy change" clutch member 48. Below the shafts 42, 45 there is a layshaft 50 having pinions 51, 52 solid with it for meshing respectively with the pinions 46, 49. This shaft also carries a pinion 53 which is slidable along the layshaft, meshes constantly with the pinion 43 and carries dog teeth 54 for engaging with corresponding dog teeth 55 on the shaft 50. It will be observed that the pinions 43, 53 are of double helical form so that they tend to keep in engagement with one another during sliding movement and that the dog teeth 54, 55 can be engaged by moving the pinion forwardly in the gear box while the dog teeth 44, 47 between the pinions 43, 46 can be engaged by moving the sliding pinions rearwardly in the gear box.

In this gear box the first speed is engaged by moving the pinions 43, 53 forwardly to drive the layshaft 50 and then engaging the "easy change" clutch member 48 with the pinion 49 so that the small pinion 52 drives the driven shaft 45 from the layshaft. By moving the "easy change" clutch member forwardly to engage the pinion 46 the layshaft drives the driven shaft 45 at a higher speed. This constitutes second gear. Upon moving the "easy change" clutch member 48 to neutral the sliding gear wheel 43 may readily be drawn backwards to cause the dogs 44, 47 to engage with one another and the pinion 46 is then directly driven by the driving shaft 42. In this position if the "easy change" clutch 48 is moved rearwardly the driven shaft 45 will be operated through the gears 46, 51, 52, 49, giving third speed, while on moving the "easy change" clutch 48 forwardly to engage directly with the pinion 46 a direct drive from the shaft 42 to the shaft 45 is instituted giving top speed. By this means four speeds are obtained with only three pairs of gear wheels and as in the case of Figure 1 the easy gear change is obtained on all four gears without the use of more than one double "easy change" clutch member.

Figure 3 illustrates in somewhat greater detail a four speed change speed gear on the same general lines as Figure 2 but differing in that none of the gears has any sliding movement. It is to be assumed that an engine and clutch are located (to the left of the figure) in the usual way and that the clutch drives a shaft 60 which is journalled by a ball bearing in the casing 61. The shaft 60 is keyed to a pinion 62 and it carries beyond the pinion dog teeth 63. In the end of the shaft is journalled the front end 64 of a driven shaft 65.

Below the shafts 60, 65 and parallel thereto there extends stationary spindle 66 on which is journalled a hollow layshaft 67 carrying a freely rotatable pinion 68 which meshes with the pinion 62. The layshaft has keyed upon it a second pinion 69 carrying dog teeth 70 and the pinion 68 is provided with a hub 71 carrying splines 72 on which slides a dog clutch member 73 which can be engaged when desired with the dog teeth 70 to lock the pinion 68 to the layshaft and the gear 69.

The gear 69 meshes constantly with a pinion 74 mounted on the driven shaft 65 with an interposed needle-roller bearing 75. The pinion 74 carries splines 76 on which slides a dog clutch member 77 for engagement when desired with the dog teeth 63 on the end of the driving shaft 60. The dog clutch members 73, 77 are engaged respectively with forks 78, 79 on a sliding rod 80 so that they are operated together and the clutch 77 is engaged to lock the pinion 74 to the driving shaft 60 only when the clutch 73 is free and vice versa. This arrangement of pinions constitutes the first speed change mechanism of the gear giving either a direct drive or a low speed drive to the driven pinion 74.

Also mounted to rotate freely on the driven shaft 65 is a pinion 81 which is in constant mesh with a pinion 82 cut in the end of the layshaft 67. The pinions 74, 81 carry friction clutch surfaces 83, 84 and dog teeth 85, 86 for engagement with an "easy change" gear member 87 splined on the shaft 65 and located between the two pinions. This mechanism constitutes the second speed change mechanism of the gear and permits the drive to be taken from the pinion 74 either through the layshaft and the gears 82, 81 or directly from the pinion 74 through the clutch member 87 to the driven shaft.

Figure 4:
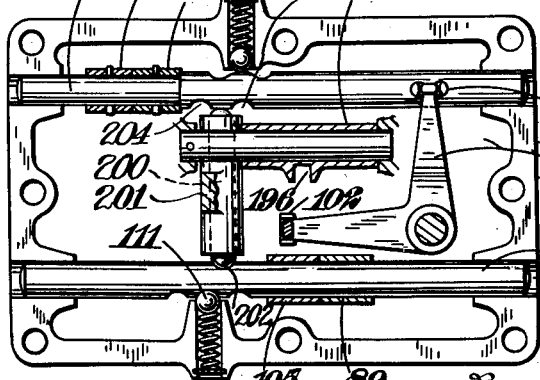
Figure 4 is a plan of the top of the gear box with the cover removed, certain of the parts being shown in section upon the line 4—4 of Figure 3.

The easy change clutch member 87 carries an operating collar 88 which is engaged by a fork 89 on a longitudinally movable shift rod 90 which is parallel with the previously described rod 80 but on the opposite side of the gear box as clearly seen in Figure 4.

In the gear now being described the reverse drive is provided for by cutting a reverse drive pinion 91 on the layshaft 67 and mounting a co-operating reverse pinion 92 on the driven shaft 65. As best seen in Figure 6 a sliding pinion 93 on a reverse layshaft 94 serves to connect the pinions 91 and 92 when reverse gear is to be operated. The reverse pinion 93 is controlled by a fork 95 carried on a hub 96 which slides on a rod 97 spanning the cover portion 98 of the gear box at a slightly higher level than the shift rods 80, 90.

The changing of the gears is effected by means of a gear lever 100 mounted in a universal joint 101 at the top of an upward tubular extension of the gear box cover 98. Control of the gears is so effected that they can only be moved in the order hereinbefore described, that is to say, the "easy change" clutch member 87 must be in neutral whenever the dog clutches 73, 77 are moved. To this end it is arranged that the shift rod 80 of the dog clutches 73, 77 is moved by transverse movements of the gear lever 100, while the shift rod 90 of the "easy change" gear lever is moved by fore-and-aft movements of the gear lever 100. The bottom end of the gear lever 100 lies in a fork 102 (Figures 4 and 6) in one arm of a bell crank lever 103. The other arm of the bell crank lever works in a fork 104 carried in the rod 80. Thus transverse movements of the gear lever operate the dogs 73, 77 to effect speed change in the first speed change mechanism of the gear.

A pin 200 slidable in a supporting sleeve 201 has rounded ends one of which is adapted to register with a groove 202 in rod 90 and the other of which is adapted to register with either of the grooves 203, 204 in rod 80. As above described, transverse movements of lever 100 effect a movement, one way or the other, of rod 80 to operate dogs 73 or 77. Movement of rod 80 brings groove 203 or 204 into register with pin 200 and this can slide into the groove when rod 90 is subsequently moved by longitudinal movements of the lever 100 to engage the clutch member 87. Once the lower end of pin 200 is moved out of the groove 202 the rod 80 is locked; in other words the arrangement constitutes a stop means such that unless the clutch member 87 is in neutral, with groove 202 registering with pin 200, the rod 80, and consequently the dogs 73 and 77 cannot be moved.

Figure 5:
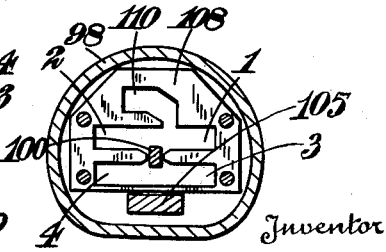

The sliding rod 90 which controls the "easy change" clutch member 87 carries an upstanding arm 105 having a fork 106 at its upper end which engages a boss 107 on the gear lever 100. By this means fore-and-aft movements of the gear lever move the "easy change" clutch 87 and owing to the use of the fork 106 the transverse movements for operating the first speed change mechanism are not interfered with. A gate 108 is provided near the bottom of the upward extension of the cover 98, which gate is best seen in Figures 5 and 7, the gear lever 100 being indicated in section at the mid-point of its movement. It will be seen that the transverse movement to change the first speed change mechanism can only be effected when the gear lever has been brought to its mid position in a fore-and-aft direction in which position the "easy change" clutch 87 is in neutral.

Thus the gate provides an additional guide to ensure that the "easy change" clutch is in neutral when the first clutch is operated: in other words it constitutes a further stop means to prevent actuation of the control lever 100 to operate clutches 73 and 77 unless and until clutch 87 is in neutral. On this gate the gear positions are numbered 1, 2, 3, 4, representing the first, second, third and top gear positions of the lever respectively and it will be seen that not only is the gear caused to function in the desired manner but that these positions correspond to the normal positions of the gear control lever for a four speed gear box, bearing in mind that the gate is located below the universal joint 101 and that the positions of the control knob of the gear lever 100 are therefore reversed and inverted compared with the positions shown in the gate.

If the gears are cut with helical teeth in order to ensure silent running care should be taken in cutting the teeth on the pinions 69 and 74 to see that the direction of the spiral is such that, when the pinion 74 is driving the pinion 69, the reaction of the drive, which causes end thrust on the pinion, is such that the pinion is forced to the left in the figure. It follows that when the pinion 74 is being driven the reaction will be in the opposite direction and it will be forced to the right. As can be seen from a consideration of the figure, since the pinion 74 is a driving pinion only when it is locked directly to the driving shaft 60 by the dog clutch 77, the effect of designing the helical teeth as described is to cause the end thrust to be taken against the end of the driven shaft when the pinion 74 is driving and under these conditions there is no relative movement of rotation between the pinion and the driving shaft when the thrust is taken, on the other hand thrust is taken against a collar 165 on the driven shaft when the pinion 74 is being driven. Under this latter condition the pinion 74 is locked by the clutch member 87 to the driven shaft and thus again there is no relative movement of rotation at the place where the thrust is taken. Expensive thrust bearings are thus avoided.

A reverse notch 110 is provided in the gate which is peculiarly shaped and located so that when the reverse gear is engaged the direct gears are left in neutral. This action can best be seen by reference to Figure 7, taken in conjunction with Figure 4. It will be observed that when first the gear lever is moving from the neutral position towards the entry into the reverse slot, the gear lever shifts the bell crank lever 103 and the sliding rod 80 to engage the dog clutch 73 with the layshaft 67. It then moves forwardly a little towards the No. 1 position of the gate and thereby becomes disengaged from the fork 102 of the bell crank lever 103. This permits the gear lever to move further over and enter the reverse slot 110 of the gate, leaving the layshaft 67 in gear. During this time, and bearing in mind that the boss 107 of the gear lever lies nearer to its centre of motion than does the fork 102 below it, the boss 107 will remain in the fork 106. Consequently the rod 90 is shifted a little to the right, as viewed in the figure, but not enough to carry its central notch out of the range of the centering ball 111 (Figure 4). As the gear lever moves diagonally along the entering part of the reverse notch 110 it slides diagonally out of the rear side of the fork 106 which is shorter than the front side thereof and bevelled as shown at 112 (Figure 7). The lateral movement of the gear lever accompanying this motion engages the lower end of it in the notch 196 in the hub 96 of the reverse fork 95 and the final longitudinal movement slides the gear 93 into place.

On reversing the movement to get back into neutral, but for the fact that, as already mentioned, one side of the fork 106 is longer than the other, there would be some chance that the boss 107 would not get back into the fork 106. Owing, however, to the fact that as shown at 113 one side of the fork is prolonged, it lies in the path of the returning boss 107, meets it face to face and then as the gear lever moves diagonally out of the reverse slot the fork 106 is moved rearwardly with it and full re-engagement with the fork is secured. It will be appreciated that the slight movement towards the gate 1 necessary to disengage the bottom end of the gear lever from the fork 102 is not adequate to carry the fork 106 to a position where the "easy change" clutch 87 becomes engaged, and therefore the second change speed mechanism of the gear remains in neutral throughout the period of engagement and operation of the reverse gear.

Referring to Figures 8 and 9, 120 represents the crank-case of an engine to which is bolted a clutch chamber 121, a casing 122 containing a first speed change mechanism and a second casing 123 containing a second speed change mechanism, the first and second speed change mechanism being supposed to be constructed in any of the ways hereinbefore described. A clutch operating lever 124 is provided and a link 125 connects the same to a valve 126 in a suction or fluid pressure pipe 127 so that the pipe is opened only when the clutch is disengaged.

Two double acting servo motors are provided one for operating one gear change and the other for operating the other. The front servo motor has cylinders 128, 129 for operating the first speed change mechanism and the second motor has cylinders 130, 131 for operating the second speed change mechanism. The cylinders are opposed and single acting and contain pistons which are linked together so that the two pistons in the cylinders 128, 129 operate a speed change arm 132 for the first mechanism while the pistons in the cylinders 130, 131 operate a speed change arm 133 for the second mechanism.

A control valve 134 is provided which contains two piston valves 135, 136 and the piston valves 135, 136 are linked to the respective servo motor mechanisms by floating levers 137, 138 connected at one end respectively to the arms 133, 132 and at the other end to the valves 135, 136. To the mid-point of the levers there are connected links 139, 140 and the links are operated by a preselector gear lever 141 through linkage shown in Figure 9.

It will be seen that the link 139 is directly connected to the lower end of the gear lever 141 (which is pivoted universally at its centre 142), while the link 140 is connected to the gear lever through a bell crank lever 143 having a longitudinal slot 144 so that the link 140 is operated by transverse movements of the gear lever.

The suction or pressure pipe 127 has a branch 150 which enters the valve casing 134 and is controlled by an interlock portion of the valve 136 which governs the flow through an interlock port 151 to the motor-controlling chamber 152 of the valve 135. Fluid pressure or suction can be connected, by the valve 135, when it moves either to the left or to the right with either the cylinder 130 or with the cylinder 131, the atmosphere being at the same time put into communication with the other cylinder.

A second branch 153 of the pipe 127 is connected through an interlock passage 154 by the valve 135 with the chamber 155 of the valve 136 which similarly controls the two cylinders 128, 129 of the first gear.

It will be seen that assuming the gear lever 141 is in the neutral position shown in Figure 9 of the drawings, movement to the right or left will shift the link 140 so that the floating lever 138 is moved either to the right or left as viewed in Figure 8. This will open one or other of the cylinders 128, 129 to the interlock passage 154. No change in the gear is thereby effected, however, because the fluid flow is cut off firstly by the cylindrical portion 156 of the valve 135 and secondly by the plug valve 126. Movement of the gear lever in a fore-and-aft direction will now operate the link 139 and shift the valve 135 either to the left or the right in Figure 8. This sets servo motor cylinders 130 or 131 as the case may be for action and opens the interlock passage 154 leading to the control chamber 155 of the first gear change mechanism. The gear is thus preselected and as soon as the clutch pedal 124 is depressed fluid flows through the passage 153, the interlock passage 154 and the chamber 155 to the appropriate cylinder 128 or 129 and the first speed change mechanism is operated, the second speed mechanism meanwhile remaining at neutral because the interlock passage 151 has been closed by the movement of the valve 136. As soon as the valve 136 has been restored to its initial position by the operation of the servo motor 128, 129, which means that the first speed change mechanism has been engaged, the passage through the branch 150 and interlock passage 151 is opened and the second servo motor now moves to engage the second speed change mechanism, which it will be remembered, is of "easy change" type. Upon the clutch pedal being released the drive is taken up. To move into the next higher gear the gear lever 141 is merely moved to the other end of the longitudinal control slot in the gate 160 and when next the clutch pedal is depressed the servo motor 130, 131 will move the "easy change" gear over into the other position, the port which connects the passages 150, 151 being already open for this purpose since the gear lever has not moved the link 138 in this operation and the valve 136 remains in the position in which it is shown in Figure 8.

To change from a gear in one of the longitudinal slots of the gate 160 to a gear in the other of the longitudinal slots the gear lever 141 is merely moved across to the appropriate notch in the diagonally remote corner from the last gear and this moves both the valve 135 and the valve 136. The movement of both these valves is equal to double that which occurs in moving from the neutral position shown in Figure 9 to any one of the corners of the gate and this is, therefore, sufficient to bring one of the grooves 157 or 158 of the valve 136 opposite the branch 150 and to bring one of the cylindrical portions 159, 149 of the valve 135 opposite the port 153. The first effect will therefore be, seeing that the branch 150 is open to cause the servo motor 130, 131 to move into the neutral position. This will cause it to open the interlock passage 154 and the servo motor 128, 129 will likewise move into the neutral position. In so doing it will close the branch 150 leading to the servo motor 130, 131 and prevent the latter from moving further until the servo motor 128, 129 has moved into the other gear in which position it again opens the transverse passage 151 and the servo motor 130, 131 finally moves into the new gear.

It will be understood that the details of the lap and lead of the valves 135, 136 in relation to the ports shown need to be properly proportioned to ensure operation in the manner described and that owing to the small scale of the parts the proper proportions are not accurately indicated in the figure.

If it is desired to use a preselector lever mounted, say, upon the steering column of a motor vehicle instead of the lever 141 it will be obvious that this can be arranged by causing the preselector lever to move cams which impart the hereinbefore described motions to the links 139 and 140.

If the interconnection with the clutch is eliminated, the above described mechanism becomes a servo operating mechanism for the gear box, which in some cases would be preferable to a preselective mechanism.

Although in the drawings the first gear change mechanism has been described as being provided with plain dog clutches and no synchronizing mechanism, it is to be understood that synchronizing mechanism may be provided on the first speed change mechanism as well as the second. However such synchronizing clutches can be of small dimensions and simplified type inasmuch as they have only to deal with the inertia of the gears themselves.

Furthermore, although in the actual constructions described the driven shaft is constituted by a shaft in line with the driving shaft it will be understood that it is within the scope of the invention to take the drive from the layshaft (such as the shaft 232 in Figure 1). The drive is then indirect on all speeds but by properly proportioning the pinions satisfactory ratios can be obtained and as this gives a lower position for the driving shaft it offers advantages in certain cases.

I claim:—

1. Power transmitting mechanism comprising first and second ratio changing devices arranged in series, each device having an input element and an output element, the first device adapted to receive power from the engine and the second adapted to deliver power to the drive wheels, the output element of the first device and the input element of the second device rotatable as a unit, clutches associated with said devices whereby the speed ratio of its output element to its input element may be varied, together with synchronizing means associated with the clutch of the second device only whereby, by shifting the first clutch to driving position before the second, synchronous shifting is available for all speeds together with means to operate the clutch of the first device only when the clutch of the second device is in its neutral position.

2. Power transmitting mechanism comprising first and second ratio changing devices arranged in series, each device having an input element and an output element, the first device adapted to receive power from the engine and the second adapted to deliver power to the drive wheels, the output element of the first device and the input element of the second device rotatable as a unit, clutches associated with said devices whereby the speed ratio of its output element to its input element may be varied, together with synchronizing means associated with the clutch of the second device only whereby, by shifting the first clutch to driving position before the second, synchronous shifting is available for all speeds together with means to operate the clutch of the first device only when the clutch of the second device is in its neutral position, said means including a lever movable in one direction to manipulate one clutch and in a different direction to operate the other clutch.

3. Power transmitting mechanism comprising first and second ratio changing devices arranged in series, each device having an input element and an output element, the first device adapted to receive power from the engine and the second adapted to deliver power to the drive wheels, the output element of the first device and the input element of the second device rotatable as a unit, clutches associated with said devices whereby the speed ratio of its output element to its input element may be varied, together with synchronizing means associated with the clutch of the second device only whereby, by shifting the first clutch to driving position before the second, synchronous shifting is available for all speeds together with means to operate the clutch of the first device only when the clutch of the second device is in its neutral position, said means including a lever movable in one direction to manipulate one clutch and in a different direction to operate the other clutch, and a stop to prevent said lever from manipulating the first clutch when the second clutch is engaged.

PIO FRANCO MARTINUZZI.